United States Patent [19]
Hoffman

[11] 3,870,907
[45] Mar. 11, 1975

[54] LUBRICANT COOLING APPARATUS FOR A VERTICAL ELECTRIC MOTOR

[75] Inventor: Orville William Hoffman, Los Gatos, Calif.

[73] Assignee: General Electric Company, Schenectady, N.Y.

[22] Filed: Oct. 11, 1973

[21] Appl. No.: 405,563

[52] U.S. Cl. ...................... 310/64, 310/90, 165/47, 184/104
[51] Int. Cl. ............................................. H02k 5/18
[58] Field of Search ........... 310/52, 157, 53, 89, 58, 310/91, 59, 66, 64, 66, 90, 260; 184/104, 6.22; 123/41.33; 165/47; 308/5 R, 78, 87 A, 123, 135, 139

[56] References Cited
UNITED STATES PATENTS

| | | | |
|---|---|---|---|
| 1,610,726 | 12/1926 | Arutunoff | 310/157 |
| 2,164,837 | 7/1939 | Pfleger | 310/157 |
| 2,246,751 | 6/1941 | Nelson | 310/157 |
| 2,813,763 | 11/1957 | Eisenhart | 308/77 |
| 2,836,471 | 5/1958 | Luenberger | 308/77 |
| 2,922,278 | 1/1960 | Szydcoaski | 308/77 |
| 3,739,207 | 6/1973 | Keilmann | 310/59 |

*Primary Examiner*—R. Skudy
*Attorney, Agent, or Firm*—Vale P. Myles

[57] ABSTRACT

A vertical motor having a heat-generating thrust bearing that is immersed in liquid lubricant is provided with a lubricant cooling apparatus comprising a plurality of articulated U-shaped ducts both legs of which are vertically mounted in the liquid lubricant to afford maximum heat exchange exposure therewith. The legs of each of the U-shaped ducts are radially aligned with the motor drive shaft and the mouths of each of the outermost legs are in communication with the exterior of the motor whereas the mouths of the innermost legs are in communication with the interior of the motor. Thus, fan blades associated with the motor rotor are operable to draw air through both legs of the U-shaped ducts to the interior of the motor housing, causing the air to flow over heat exchanger fins in the U-shaped ducts thereby to efficiently cool the liquid lubricant and the thrust bearing.

6 Claims, 3 Drawing Figures

LUBRICANT COOLING APPARATUS FOR A VERTICAL ELECTRIC MOTOR

BACKGROUND OF THE INVENTION

This invention relates to apparatus for cooling liquid lubricant in a vertical motor so that a heat-generating thrust bearing in contact with the lubricant is maintained in a safe operating range of temperatures. More specifically, the invention discloses an efficient air-to-lubricant heat exchanger that is free from the manufacturing and maintenance problems normally associated with related lubricant cooling systems that utilize a water-cooled heat exchanger.

Generally speaking, it is well known in the field of vertical electric motors to use various types of heat exchanger apparatus to maintain the temperature of liquid lubricants within the motor in a desirable operating range of temperatures. Such prior art apparatus can be divided into two broad groups; namely, (1) lubricant-to-air heat exchangers and (2) lubricant-to-water heat exchangers. Typically, when the type of thrust bearing or size of motor involved is such that relatively little heat is dissipated from the thrust bearing into the lubricant in contact with it, air cooled heat exchangers are used; whereas, in larger motors that use Kingsbury thrust bearings which generate significantly more heat, it has been common practice to use water cooled heat exchangers for the lubricant in contact with the bearing. An example of a prior art air-cooled heat exchanger system for a vertical electric motor is shown in U.S. Pat. No. 2,813,763-Eisenhart, which issued on Nov. 19, 1957. A more complex oil-to-air heat exchanger arrangement for a vertical motor is shown in U.S. Pat. No. 2,836,471-Luenberger, which issued May 27, 1958. In the Luenberger system, liquid lubricant is withdrawn from a lubricant well that is in contact with a motor bearing then the lubricant is circulated outside of the lubricant well in heat exchange relationship with air that is drawn into the motor housing by the rotor fan blades. In conventional water-cooled heat exchangers, a coil somewhat similar to that disclosed in the Luenberger patent is mounted directly in the lubricant well and cooling water is pumped through the coil to cool the lubricant.

As mentioned above, the superior cooling efficiency of water type heat exchanger systems for vertical electric motors has heretofore dictated their use in combination with certain types of high-heat-generating motors. This was so despite the fact that such water cooling systems are inconvenient and costly to manufacture and maintain. One particular drawback of such a system is the susceptibility of the cooling arrangement to freezing when used on motors that are exposed to the elements. Since many vertical motors are applied in outdoor water pumping systems, this latter problem is a major concern to customers. Therefore, it has long been recognized that it would be desirable to provide a lubricant cooling system for a vertical electric motor that would provide adequate cooling for heavily loaded Kingsbury-type thrust bearings, while at the same time avoiding the use of water as a heat exchange medium.

OBJECTS OF THE INVENTION

An object of the present invention is to provide a vertical electric motor with a lubricant cooling apparatus that will be operable to maintain the temperature of Kingsbury-type thrust bearings within an adequate temperature range while at the same time, avoiding the aforementioned problems often associated with water-cooled heat exchanger systems.

Another object of the invention is to provide a lubricant-to-air heat exchanger that is economical to manufacture and install in a vertical electric motor.

A still further object of the invention is to provide an articulated heat exchanger structure that is easily manufactured and assembled in a vertical electric motor and that is easy to maintain during operation of the motor.

Yet another object of the invention is to provide a vertical electric motor with a lubricant-to-air heat exchanger having an air flow path that extends through the depth of lubricant in contact with the thrust bearing of the motor two times, thereby to optimize the cooling efficiency of the heat exchanger.

Additional objects and advantages of the invention will become apparent to those skilled in the art from the disclosure of it that is presented herein, taken in conjunction with the accompanying drawings.

SUMMARY OF THE INVENTION

In one preferred embodiment of the invention, a vertical electric motor having a Kingsbury thrust bearing immersed in liquid lubricant contained in a lubricant well is provided with an oil-to-air heat exchanger apparatus that is effective to remove sufficient heat from the lubricant and the thrust bearing to enable it to operate within a desired temperature range. The lubricant cooling apparatus comprises a plurality of U-shaped ducts that form air passageways extending from the exterior of the motor housing to the interior thereof in a manner such that cooling air is passed twice through the liquid lubricant. The air passageways through the U-shaped ducts are provided with elongated-radiating fins on the interior surface thereof to improve the heat exchange efficiency between the air passing through the passageway and a lubricant adjacent thereto. Each of the U-shaped ducts are mounted with their respective legs in radial alignment with the drive shaft of the motor and adequate space is provided between the ducts to permit lubricant to circulate freely around them so that the cooling efficiency of the apparatus is further improved.

DESCRIPTION OF A PREFERRED EMBODIMENT

Figure 1:
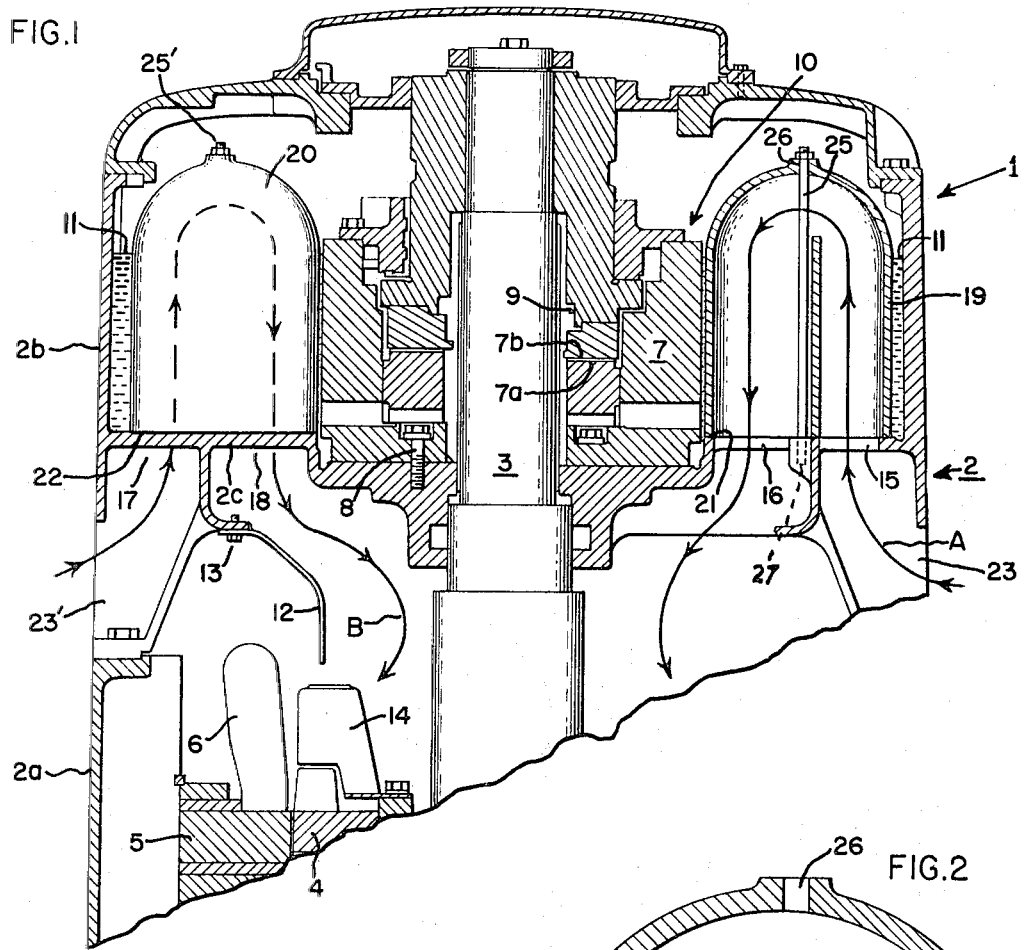
FIG. 1 is a side elevation view, partly in cross-section, of the upper portion of a vertical electric motor having a liquid cooling apparatus therein constructed pursuant to the present invention.

Referring now to FIG. 1, it will be seen that there is shown the upper portion of a vertical electric motor 1 that has a multi-part hollow metal housing 2 comprising a frame, in the form of a central cylindrical casing portion 2a, and a separable end shield or cap portion 2b, as well as another conventional end shield (not shown) at the opposite end of the motor. A drive shaft 3 is rotatably mounted in any suitable manner within the housing 2 and supports a rotor 4 rigidly mounted thereon. A conventional stator 5 and a stator winding 6 are rigidly mounted in the central casing portion 2a of housing 2 with a sufficient air gap between the stator and the rotor 4 to enable the rotor to spin freely within the housing.

In order to support the drive shaft 3 on its vertical axis of rotation, a Kingsbury thrust bearing, designated generally by the identifying number 7 on a cylindrical retaining wall, and having a first bearing surface 7a and a second relatively rotatable bearing surface 7b is provided. The first annular bearing surface 7a is mounted in fixed relationship to the housing 2 in any suitable manner such as by securing the bottom flange portion of the cylindrical wall portion 7 with bolts 8 to a solid metal partition 2c that form part of the top end shield and divides the interior of the end shield, or housing portion 2b, from the interior of the frame or central casing portion 2a. The second bearing surface 7b is mounted in fixed relationship to the drive shaft 3 so that it will rotate therewith. Various conventional means may be used to secure the member 7b to the shaft 3 but in the preferred embodiment, the annular bearing surface 7b is mounted in a slip-fit on the collar 9 and pins (not shown) are used to transmit torque between the members. The collar 9 is secured to the shaft 3 by being shrunk fit thereon, or by any other conventional mounting means. As shown in FIG. 1, the first bearing surface 7a is positioned to rotatably support the second bearing surface 7b when the drive shaft 3 is in its vertical operating position.

The interior walls of motor housing portion 2b and the upper surface of partition 2c, in combination with the outer surfaces of thrust bearing 7 and associated support means for the shaft 3 comprise a wall means that define a cup-shaped lubricant receiving well 10 surrounding the thrust bearing 7. A body of liquid lubricant 11, such as a suitable lubricating oil, is positioned in the well 10 in lubricating and heat exchanging or absorbing contact with the thrust bearing 7, 7a and 7b.

In addition to the generally conventional motor structure already described, the motor 1 contains an annular air baffle 12 that is mounted by a plurality of bolts on an extension of the partition 2c. The baffle 12 operates in combination with the driving force of the fan 14 mounted on the end of rotor 4 to circulate air in the manner shown by the arrows A and B in FIG. 1. This air flow will be described in detail below when the novel features of the invention have been explained in detail.

Pursuant to the invention, a plurality of air passageways 15, 16, 17, 18, etc., are defined in the bottom surface of the wall means defining the well 10. As shown in FIG. 1, each pair of these passageways, such as the matched pairs 15–16 and 17–18 are radially oriented with respect to the axis of drive shaft 3, for a purpose that will become apparent from the following description. A plurality of hollow, open-ended, generally U-shaped air ducts 19, 20, etc., are mounted in sealing relationship on the bottom surface of the wall means defining the well 10, so that the open ends of each of the ducts is placed, respectively, in alignment with one of the air passageways 15–18, et cetera.

In order to assure an effective seal between the surface of partition 2c and the open ends of the ducts 19, 20, etc., a plurality of sixteenth-inch thick Neoprene gaskets 21, 22, etc., are mounted between the partition 2c and the respective mouths of the U-shaped ducts 19, 20 et cetera. In accordance with the invention, the U-shaped ducts 19, 20, etc., are of sufficient length to extend at least to the upper surface of the lubricant 11 in the well 10 when the motor 1 is in its vertical operating position. This assures that a major part of the length of both legs of the U-shaped ducts will be in heat exchange relationship with the lubricant in the well 10.

It should be understood that the plurality of U-shaped ducts 19, 20, etc., extend around the entire circumference of the partition 2c, with a sufficient space provided between each of the ducts to allow for a free flow of the oil 11 therebetween. Thus, it will be seen that a plurality of air flow passageways are formed from the exterior of the housing 2 through the U-shaped ducts to the interior of the central housing portion 2a. Two such air flow passageways are illustrated in FIG. 1 by the arrows A and B. Suitable air inlet means 23 and 23', such as the illustrated apertures in the exterior surface housing 2 are provided in combination with similar air exhaust means (not shown) in the lower portion of the housing so that air can be moved by the force of the rotating fan 14 into one leg of each of the U-shaped ducts (19, 20) and out of the other leg of each of the respective ducts. This movement of cooling air in combination with the circulation of the oil 11 around each of the articulately mounted U-shaped ducts is effective to cool the oil 11 sufficiently to enable the thrust bearing 7 to operate safely.

Figure 3:
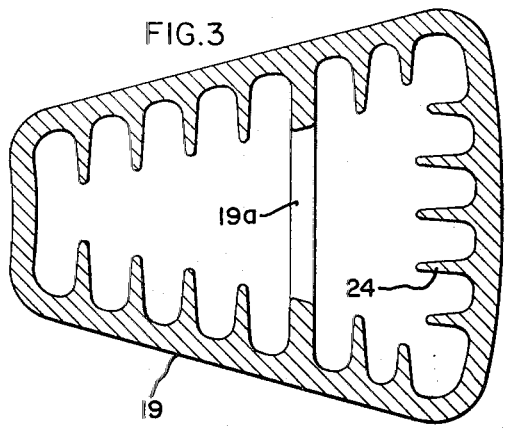
FIG. 3 is a top view, taken in cross-section along the plane 3—3 shown in FIG. 2, to illustrate the interior, finned surface of the U-shaped duct illustrated in FIG. 3.
Figure 2:
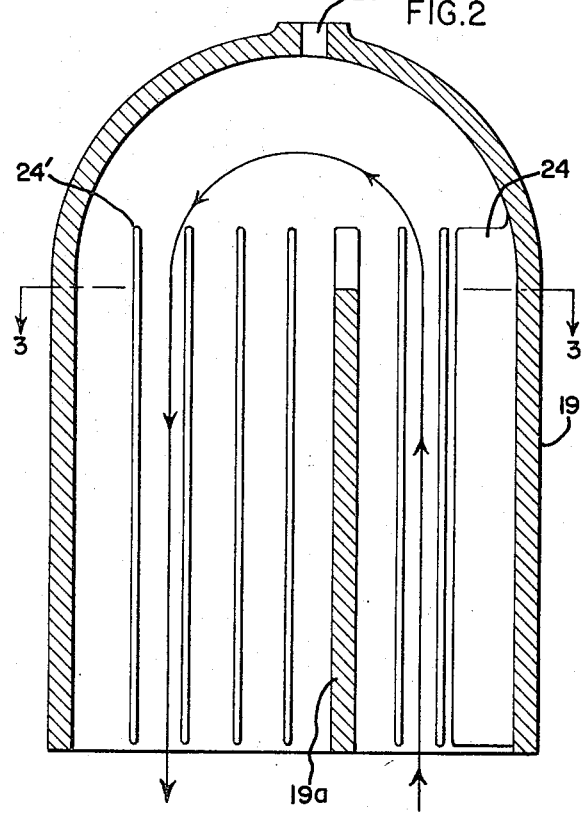
FIG. 2 is an enlarged side elevation view, taken in cross-section along a plane near the center thereof, showing a U-shaped duct for the lubricant cooling apparatus of the invention depicted in FIG. 1.

Turning now to FIGS. 2 and 3 of the drawings, a further description of the novel features of the U-shaped ducts of the invention will be presented. An enlarged view of the U-shaped duct 19 is shown in FIG. 2. This view of the duct exposes its interior surface to reveal a plurality of integral fins 24, 24', etc., that are formed respectively on the interior surfaces of the duct 19 in substantial alignment with the longitudinal axes of the respective legs of the ducts. As shown, the fins 24, 24', etc., are substantially co-extensive with the length of the duct legs and each of the fins project at least one-half inch inward toward the center of the duct so that a highly efficient heat exchanger arrangement is provided without unduly obstructing the passageway that enables air to be drawn through the ducts into the interior of the motor 1.

The respective parallel legs of each of the U-shaped ducts, such as the duct 19 shown in FIGS. 2 and 3, are separated by an integral partition 19a that extends from the mouth ends of the legs to the lower part of the bight portion of the respective ducts. Ideally, this partition divides the two legs of the respective ducts into substantially equal cross-sectional areas, despite the fact that the ducts are generally triangular in configuration to enable them to be spaced in an efficient manner circumferentially around the surface of the dividing partition 2c. This arrangement of the partition 19a also affords clear access to the longitudinal axis of the ducts 4a for supporting bolts 25, 25', etc. (see FIG. 1), a plurality of which are mounted respectively in apertures 26 through the bight of each of the ducts (19, etc.) and in threaded apertures 27 in the bottom surface 2c of the wall means defining the lubricant well 10. As is clear from the illustration in FIG. 1, the respective bolts 25, 25', etc., are operable when rotated into their respective threaded apertures 27, etc., to clamp the respective ducts (19, 20, etc.) against the sealing gaskets 21, 22, et cetera. This simple and inexpensive mounting arrangement for the lubricant cooling means of the invention has been found to be particularly economical in the manufacture of the cooling apparatus as well as affording an optimum means for maintaining it.

The operation of the lubricant cooling apparatus of the invention is believed to be apparent from the foregoing description of its structure; however, to briefly summarize the mode of operation of the invention, reference can be made to FIG. 1 of the drawings wherein the arrows A and B depict the flow of cooling air from the exterior surface of the housing 1 through the U-shaped ducts 19, 20, etc., past the annular baffle 12 and through the apertures between the fan blades 14 into contact with the winding 6 of the stator 5. The cooling air then flows through the axial length of the motor to the lower portion of the housing 2 (not shown) from whence it is exhausted through suitable exhaust means such as apertures similar to the inlet apertures 23 and 23'. Because the liquid lubricant 11 in lubricant confining well 10 is placed in intimate contact with the thrust bearing 7 and all sides of each of the U-shaped ducts, the air flow pattern just described is effective to remove enough heat from the oil, and thus, from the thrust bearing 7, to maintain the running temperature of the bearing within a suitably safe range to assure its long life. Accordingly, the invention affords the major objectives set forth initially above.

Those skilled in the art will recognize that various modifications and alternative embodiments of the invention may be developed from the teaching of it that is presented herein. For example, the U-shaped, articulated ducts 19, 20, etc., may be formed internally with the partitions 2c in some embodiments of the invention. It will also be appreciated that the invention is ideally suited for use with other high-loss bearings, in addition to the Kingsbury type of bearings illustrated and discussed at length herein. Spherical roller thrust type bearings can also be used with the novel cooling arrangement of the invention, instead of requiring a water cooling arrangement of the kind now commonly used with such bearings. Accordingly, it is my intention to encompass within the following claims the true spirit and scope of the invention.

What I claim and desire to secure by Letters Patent of the United States is:

1. Lubricant cooling apparatus for a vertical electric motor having a hollow metal housing, a stator rigidly mounted in the housing, a drive shaft rotatably mounted in the housing, a rotor supported on said shaft, a thrust bearing having a first bearing surface mounted in fixed relationship to said housing and a second bearing surface mounted in fixed relationship to said shaft to rotate therewith, said first bearing surface being positioned to support in sliding, rotatable relationship, the second bearing surface when the drive shaft is in its operative position, wall means defining a cup-shaped lubricant-receiving well surrounding said thrust bearing, and a body of liquid lubricant positioned in said well in lubricating and heat absorbing contact with said thrust bearing, said lubricant cooling apparatus comprising means defining a plurality of air passageways in a bottom surface of said wall means, a plurality of hollow, open-ended, generally U-shaped air ducts, both open ends of each of said ducts being mounted in sealing relationship on the bottom surface of the wall means defining said lubricant well, thereby to place the open ends of each of the ducts, respectively, in alignment with one of said air passageways, said ducts being of sufficient length to extend at least to the upper surface of said lubricant when the motor is in its vertical operation position thereby to position a major part of the length of both legs of each of the ducts in heat exchange relationship with the lubricant in said well, air inlet and exhaust means in said housing for moving air into one leg and out of the other leg of each of the respective ducts, and a plurality of gaskets each mounted, respectively, in sealing relationship around one of said air passageways between the open end of one of said ducts and the bottom surface of said wall means.

2. An invention as defined in claim 1 including a plurality of threaded bolts mounted respectively in apertures through the bight of each of said ducts and in threaded apertures in said bottom surface, said bolts being operable when rotated into the threaded apertures to clamp the ducts against said gaskets.

3. An invention as defined in claim 2 wherein pairs of air passageways through said bottom surface are arranged in radial alignment with respect to the axis of rotation of said shaft, and the radially outermost passageway in each of said pairs is substantially the same in cross-sectional area as its paired innermost passageway.

4. An invention as defined in claim 3 wherein the combined cross-section of the innermost and outermost passageways in each of said pairs generally define a triangular configuration, and wherein the open ends of said air ducts formed to cooperate with the edges of said air passageways in sealing relationship therewith.

5. Lubricant cooling apparatus for a vertical electric motor having a hollow metal housing, a stator rigidly mounted in the housing, a drive shaft rotatably mounted in the housing, a rotor supported on said shaft, a thrust bearing having a first bearing surface mounted in fixed relationship to said housing and a second bearing surface mounted in fixed relationship to said shaft to rotate therewith, said first bearing surface being positioned to support in sliding, rotatable relationship, the second bearing surface when the drive shaft is in its operative position, wall means defining a cup-shaped lubricant-receiving well surrounding said thrust bearing, and a body of liquid lubricant positioned in said well in lubricating and heat absorbing contact with said thrust bearing, said lubricant cooling apparatus comprising means defining a plurality of air passageways in a bottom surface of said wall means, a plurality of hollow, open-ended, generally U-shaped air ducts, both open ends of each of said ducts being mounted in sealing relationship on the bottom surface of the wall means defining said lubricant well, thereby to place the open ends of each of the ducts, respectively, in alignment with one of said air passageways, said ducts being of sufficient length to extend at least to the upper surface of said lubricant when the motor is in its vertical operating position thereby to position a major part of the length of both legs of each of the ducts in heat exchange relationship with the lubricant in said well, air inlet and exhaust means in said housing for moving air into one leg and out of the other leg of each of the respective ducts, and a plurality of integral fins formed on the respective interior surfaces of each of said ducts, said fins being in substantial alignment with the longitudinal axes of the legs of the U-shaped ducts and substantially co-extensive with the length of said legs.

6. An invention as defined in claim 5 wherein said fins project at least one-half inch toward the center of the ducts but leave an unobstructed passageway for air through the center of each duct over its entire length.

* * * * *